Figure 1:
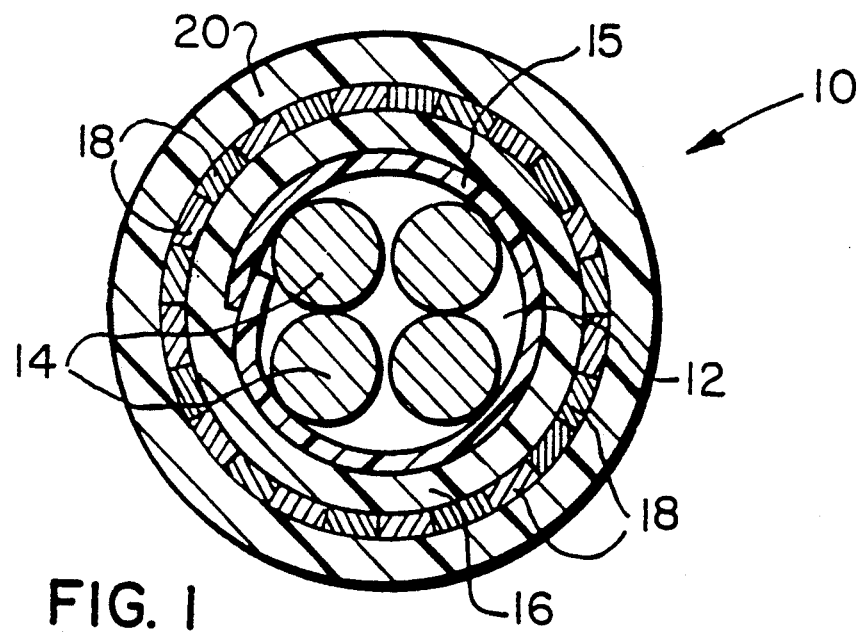

United States Patent [19]

Cornibert et al.

[11] Patent Number: 5,011,880
[45] Date of Patent: Apr. 30, 1991

[54] FIRE RETARDENT AND WATER BLOCKING FILLING COMPOSITIONS FOR CABLES

[75] Inventors: Jacques Cornibert, Ile des Soeurs; Jorg-Hein Walling, Beaconsfield, both of Canada

[73] Assignee: Northern Telecom Limited, Montreal, Canada

[21] Appl. No.: 347,131

[22] Filed: May 4, 1989

Related U.S. Application Data

[63] Continuation-in-part of Ser. No. 75,176, Jul. 20, 1987, abandoned.

[51] Int. Cl.$^5$ .......................... C08K 5/06; C08K 3/10; D02G 3/00; H01B 7/18
[52] U.S. Cl. ..................... 524/371; 524/412; 524/433; 524/436; 524/437; 174/107; 174/128.2; 428/373; 428/374; 428/380; 428/383
[58] Field of Search ............... 524/371, 412, 433, 436, 524/437; 174/128 BL; 428/373, 374, 380, 383

[56] References Cited

U.S. PATENT DOCUMENTS

| | | | |
|---|---|---|---|
| 3,879,575 | 4/1975 | Dobbin et al. | 174/92 |
| 4,075,830 | 2/1978 | Nagasawa et al. | 524/238 |
| 4,176,240 | 11/1979 | Sabia | 174/23 |
| 4,622,350 | 11/1986 | Icenogle et al. | 523/200 |

FOREIGN PATENT DOCUMENTS

| | | |
|---|---|---|
| 57-5734 | 1/1982 | Japan . |
| 72112 | 9/1983 | Japan . |
| 61-168647 | 7/1986 | Japan . |

*Primary Examiner*—Kriellion Morgan
*Attorney, Agent, or Firm*—R. J. Austin

[57] ABSTRACT

Fire retardant and water blocking material for cables having an admixture, in parts by weight, of 100 parts of amorphous polypropylene, which is in a continuous phase throughout the composition, from 10 to 70 parts of hydrated inorganic oxide or hydroxide material, and an organic halogenated material and antimony trioxide, the aggregate of the organic halogenated material and antimony trioxide being from 5 to 30 parts.

10 Claims, 1 Drawing Sheet

FIRE RETARDENT AND WATER BLOCKING FILLING COMPOSITIONS FOR CABLES

This invention relates to fire retardant and water blocking compositions for cables and is a continuation in part of application Ser. No. 075,176, filed July 20, 1987 and entitled "Fire Retardant and Water Blocking Filling Materials for Cables".

Water blocking compositions are known for use in telecommunications cables made specifically for buried application. In general, such compositions comprise grease or jelly type materials which have extremely low molecular weights compared to solid materials. The accompanying low viscosities of the compositions are necessary to enable them to be forced under pressure into cable cores and fill all of the interstices therein thereby providing effective water blockage throughout the lengths of the cables. Such filling compositions are however only suitable for water blocking and are of little or no assistance in retarding the spread of fire along the cable. Indeed, some water blocking compositions may well assist in fire spread. While problems concerning fire spread do not normally relate to a buried telecommunications cable, instances of fire spread along a cable of this type have been experienced in situations where buried cables extend upwardly above the ground for connection into terminal housings inside a building. This situation may be found particularly with buried cable referred to as buried service wire. The lengths of such cables extending above the ground are susceptible to fire damage and may assist in the spread of fir into the building itself.

Various materials have been considered for use as fire retardant and water blocking compositions, but all of them are unsatisfactory from various points of view. For instance, one composition which may otherwise be suitable for filling interstices of certain cable constructions, has been found to be incompatible with an oil component in PVC jackets of buried service wires and other buried cables, and has therefore been found unacceptable. Another composition which has been developed has been rejected because of safety and health hazard reasons together with the fact that it carries an undesirable amount of chlorwax. Chlorwax is unsuitable in a filling composition because of poor thermal stability and long term potential corrosion characteristics.

The present invention seeks to provide a fire retardant and water blocking filling composition for a cable core which avoids any safety or health hazards or will not be deleterious to the cable structure while at the same time providing desirable fire retardancy and water blocking characteristics.

Accordingly the present invention provides a fiber free fire retardant and water blocking composition for a cable in which: the composition comprises in admixture and in parts by weight, 100 parts of amorphous polypropylene, from 10 to 70 parts of aluminum trihydrate or magnesium hydroxide, and an organic halogenated material and antimony trioxide, the organic halogenated material comprising decabromodiphenyloxide, bromated diphenyl ether, tetrabromophthalic anhydride, chlorendic anhydride or hexachlorocyclopentadiene and an aggregate of the halogenated material and antimony trioxide being from 5 to 30 parts; and the amorphous polypropylene provides a continuous phase throughout the composition.

In a preferred fire retardant and water blocking filling composition, there are between 30 and 50 parts by weight of the hydrated inorganic oxide or hydroxide material to 100 parts of amorphous polypropylene. The hydrated inorganic oxide or hydroxide material preferably comprises aluminum trihydrate or magnesium hydroxide.

The aluminum trihydrate and the magnesium hydroxide are both in powder form and tend to increase the viscosity of the filling composition. These substances also take heat out of the insulation to raise the dripping temperature of the insulation. The hydrated inorganic oxide or hydroxide material, the organic halogenated material and the antimony trioxide provide a fire retardant system. Where the organic halogenated material comprises a brominated material, then the brominated material, such as decabromodiphenyloxide, releases bromine while interacting with the antimony trioxide which itself provides a cooling action to the cable by the generation of antimony pentabromide. Alternatively, where the organic halogenated material comprises a chlorinated material, then the chlorinated material, such as chlorendic anhydride, interacts with the antimony trioxide to release chlorine which together with the antimony produces antimony pentachloride which also produces a cooling action. In addition to this, the hydrated inorganic oxide or hydroxide material operates, upon heating, to release water which also has a cooling property. Thus the flame retardant system, taken as a whole, is particularly effective in its fire retardant properties.

In fiber free fire retardant and water blocking compositions according to the invention, the amorphous polypropylene has a low molecular weight to provide the composition with properties comparable to that of conventional grease or jelly type compositions used for cable core filling applications. Hence, compositions according to the invention have a grease or jelly type consistency at room temperature conditions, i.e. around 15° C. to 20° C. and operate successfully within a cable core in a water blocking function over the range of normal use temperatures down to $-40°$ C. The fire retardant and water blocking composition of the present invention may be pumped in conventional manner into a cable core so as to flow into and fill interstices between individual insulated conductors. For this purpose, the low molecular weight of the amorphous polypropylene may be in a region around 10,000. In contrast to this, it is known that crystalline extrudable grades of polypropylenes have been used for making highly rigid structures. Such crystalline polypropylenes are described in Japanese Published Patent Applications Nos. 57-5734 and 61-168647 wherein the crystalline polypropylene materials are disclosed as being suitable for making outer casings for television sets. Such crystalline materials would have molecular weights well in excess of 500,000, would be clearly unsuitable for use as fire retardant and water blocking materials in cable, and thus are completely different and cannot be compared to materials of the present invention.

Figure 2:
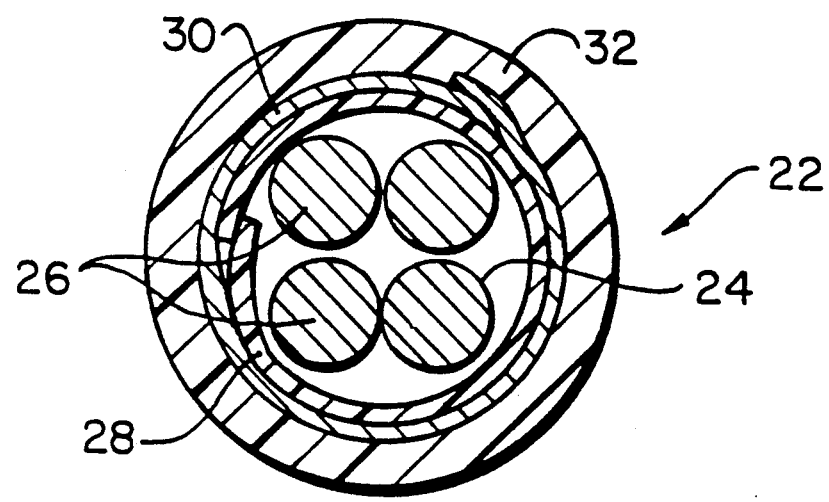

Embodiments of the invention will now be described, by way of example, with reference to the accompanying drawings, in which:

FIG. 1 is a cross-sectional view through a telecommunications cable according to a first embodiment; and FIG. 2 is a cross-sectional view through a telecommunications cable according to a second embodiment.

In a first embodiment of the invention, a buried cable or buried service wire 10 has a core 12 comprising two pairs of individually insulated 22 AWG conductors 14. Surrounding the core is a core wrap 15 and an inner PVC jacket 16 around which is disposed a metal shield in the form of side-by-side steel strips 18 which extend along the cable in helical fashion from end-to-end. Surrounding the shield is an outer jacket 20 of polyvinylchloride composition.

The core of the cable is filled with a fiber free fire retardant and water blocking composition. This composition is according to formulation 1 in the following Table I.

In modifications of the above embodiment, the cable structure, which is otherwise as described above, has a fiber free fire retardant and water blocking composition in its core and between the jackets according to either of formulations 2 and 3 in Table I.

TABLE I

|  | PARTS BY WEIGHT FORMULATION | | |
| --- | --- | --- | --- |
|  | 1 | 2 | 3 |
| AMORPHOUS POLYPROPYLENE | 100 | 100 | 100 |
| ALUMINUM TRIHYDRATE | 30 | 50 |  |
| MAGNESIUM HYDROXIDE |  |  | 30 |
| DECABROMODIPHENYLOXIDE | 6 | 6 | 6 |
| ANTIMONY TRIOXIDE | 3 | 3 | 3 |
| POLYBUTENE | 10 | 10 | 10 |
| ANTIOXIDANT | 0.2 | 0.2 | 0.2 |

In the above formulations, the amorphous polypropylene is that sold by Hercules under their designation AFAX-600 and has a molecular weight in the region of 10,000. The aluminum trihydrate was made by Solem under their Trade Mark "Micral" and magnesium hydroxide is that sold under the Trade Mark "KISUMA-5B" by Kyoma Chemical Ind. The decabromodiphenyloxide is sold under the designation FR-300-BA or RM-939965 and the polybutene is a Gulf product sold under designation 300. The antioxidant in each case consists of equal parts of "Irganox"-1010 and Irganox 1024, sold by Ciba Geigy.

For complete homogeneous dispersion, the formulations were each prepared in a Greerco homo mixer, the preparations being made in the melt at 120° C. In particular, in making each formulation, the polybutene was added to the amorphous polypropylene already in the mixer, followed by the antimony trioxide and then the decabromodiphenyloxide. After this, the aluminum trihydrate or magnesium hydroxide were added followed by the antioxidants.

In the finished fire retardant and water blocking material of the first embodiment, the amorphous polypropylene provided a continuous phase throughout the material of each formulation and had the consistency at 0° C. comparable to that of conventional grease or jelly-type filling materials for cable cores.

The core of the cable was filled with the appropriate formulation in conventional fashion for filling cable cores with jelly or grease, i.e. immediately before the extrusion of the inner jacket 16 onto the core. The avoidance of fibrous materials assisted in enabling each formulation to pass into and fill interstices between insulated conductors without resisting flow of the composition through small gaps prior to entry into the interstices. Avoidance of fibers also prevents wicking of moisture through the filling composition when it is in the cable core.

The cables of the first embodiment i.e. having filling formulation 1, and of modifications, as will be described, were tested for fire retardancy and flammability and were compared in these tests to a control cable of similar structural design, but having its core filled with a water blocking filling composition consisting merely of amorphous polypropylene. In the following Table II which gives the results of the flammability and fire retardancy tests, a control cable having its core filled solely with amorphous polypropylene is shown as Sample 1.

The cable of the embodiment and of the modification with formulation 3, are referred to a cable, Samples 2 and 4 respectively. Cable Sample 3 is of the same construction as the first embodiment, being filled with the filling composition of formulation 1. However, in Sample 3, the filling composition is also applied by conventional flooding procedures between the two polyvinylchloride jackets, i.e. in the area occupied by the spiral steel shield. Sample 5 is as the first embodiment, but with a thicker jacket as shown in Table II.

TABLE II

| CABLE SAMPLE | OUTSIDE JACKET THICKNESS (MIL) | BURN LENGTH (") | MAX BURN TIME (SECONDS) | PASS TOTAL |
| --- | --- | --- | --- | --- |
| 1 | 25 to 43 | MAX: 4<br>MIN: 3<br>MEAN: 3.25 | MAX: 40<br>MIN: 3<br>MEAN: 23 ± 14 | 10/12 |
| 2 | 23 to 37 | MAX: 4<br>MIN: 2.5<br>MEAN: 3.2 | MAX: 11<br>MIN: 2<br>MEAN: 5 ± 3 | 10/10 |
| 3 | 19 to 38 | MAX: 4<br>MIN: 3<br>MEAN: 3.5 | MAX: 5<br>MIN: 2<br>MEAN: 3 ± 1 | 8/8 |
| 4 | 26 to 39 | MAX: 4<br>MIN: 2.5<br>MEAN: 3.0 | MAX: 12<br>MIN: 2<br>MEAN: 6 ± 3 | 12/12 |
| 5 | 25 to 43 | MAX: 4<br>MIN: 3<br>MEAN: 3.25 | MAX: 7<br>MIN: 3<br>MEAN: 5 ± 2 | 6/6 |

The above tests for fire retardancy were performed according to the established Underwriters Laboratories test 83 for thermoplastic-insulated wires dated Aug. 16, 1977. In each sample, a certain number of separate cable lengths were tested. The Pass/Total column in Table II refers to the number of lengths of cable which were tested and passed the test for each sample.

As may be seen from the results of Table II, Sample 1 which merely included amorphous polypropylene as a filler had a total of 10 passes from 12 lengths of cable which were tested. It is immediately noticeable that the maximum burn time of 40 seconds is extremely long and thus gives a mean burn time of 23±14 seconds which is found to be entirely unsuitable for fire retardant requirements. In addition to this, the two lengths of cable in Sample 1 which failed the test had a burn time of 60 seconds.

The burn times of the cable lengths in Sample 1 are directly comparable and contrast significantly with the burn times of the lengths of cable of the other Samples. Although it is noticeable that the burn lengths of all the samples were similar, there is no doubt that the maximum burn time of any of Samples 2 to 5 was reduced phous polypropylene as the base material ensures that the composition also retains its normal water blocking properties. Further, it has been shown that the use of the composition formulations in the embodiment and modifications described above had no deleterious effect upon the required properties for the outer jacket or the dielectric properties of the cable. This is clearly shown from an examination of Table III below. Also, the cable maintained other requirements in use such as drip test, water resistance and water blocking characteristics. This is shown by Table IV below.

TABLE III

| PROPERTY | REQUIREMENT | SAMPLE 1 | SAMPLE 2 | SAMPLE 3 | SAMPLE 4 |
|---|---|---|---|---|---|
| Outer Jacket | | | | | |
| elongation (unaged) | 150% min | 312% | 300% | 265% | 300% |
| | | (325,312,300) | (287,300,300) | (225,275,300) | (312,300,304) |
| elongation retention | 75% min | 100% | 105% | 99% | 96% |
| aged (212° F. - 48 h) | | (325,312,300) | (300,315,325) | (262,287,250) | (287,287,287) |
| Wrap test (1" mandrel - 10° F. - 4 h) | no crack | pass | pass | pass | pass |
| LOI flammability | 2/10 may burn | pass | pass | pass | pass |
| | 26% min | 28.3 | 28.3 | 28.3 | 28.3 |
| Dielectric | | | | | |
| conductor resistance | 17.2 m/ft | 17.0 | 15.65 | 16.4 | 15.3 |
| resistance unbalance | 5% max | 1.8 | 0.77 | 0.39 | 1.2 |
| | 1.5% avg | 0.94 | 0.48 | 0.39 | 0.89 |
| shield resistance | 16 m/ft | 14.74 | 14.03 | 14.98 | 13.38 |
| insulation resistance | $5.10^9$ /kft | $13 \times 10^{10}$ | $52 \times 10^9$ | $66 \times 10^9$ | $23 \times 10^9$ |
| mutual capacitance | 20 nf/kft max | 15.4 | 16.2 | 16.8 | 15.7 |
| CUPP (1 kHz) | 45 pf/kft max | 8.4 | 3.5 | 8.4 | 0.88 |
| Dielectric strength (5s) | 7.2 kV-AC | pass | pass | pass | pass |

TABLE IV

| PROPERTY | REQUIREMENT | SAMPLE 1 | SAMPLE 2 | SAMPLE 3 | SAMPLE 4 |
|---|---|---|---|---|---|
| Completed Wire | | | | | |
| Drip Test (158° F. - 4 h) | 0.8 ml max | 0.0 | 0.0 | 0.0 | 0.0 |
| Water resistance | 20% increase M. C. max | 2.0% | 6.1% | 2.3% | 8.1% |
| Water blocking (3 ft head) | no flow 6 ft length 3 ft length | pass pass (48 h) | pass pass (48 h) | pass pass (48 h) | pass pass (48 h) | significantly below that of Sample 1 thereby reducing the amount of smoke generated and the continuation of heat available for potential spread of the fire. In addition, all of the other cable lengths of the other samples easily passed the required test under UL 83.

It is clear from the above results, that the filling composition composed of formulations 1 or 3 provides a fire retardant system which is extremely effective for cables. The decabromodiphenyloxide together with antimony trioxide operates to produce bromine which results in antimony pentabromide to produce a cooling action. This is assisted by the release of water by either the aluminum trihydrate or magnesium hydroxide. Thus the ingredients of the flame retardant system in each case are extremely effective in removing the heat from the burn area thereby significantly minimizing the burn time on the cable test lengths.

Acceptable fire retardancy has thus been shown in compositions in which amorphous polypropylene provides a continuous phase in the composition and in which the composition, in-situ within a cable, has no large localized mass, but is, in contrast, separated into small volumetric spaces (i.e. the core interstices) by the insulated conductors of the core.

It follows that the fire retardant and water blocking filling compositions of the invention are acceptable for use in an above ground situation in relation to a building. In addition to this, the incorporation of the amor- The formulations discussed above are not only for use with a cable of the structure described in the first embodiment and its modifications, but would be entirely suitable for any cable which is intended for buried use and having lengths of cable which are exposed above the ground. For instance, in a second embodiment as shown in FIG. 2, a cable 22 has a core 24 with two pairs of conductors 26 of the structure described for the core in the first embodiment. Surrounding the core is a core wrap 28 formed from suitable material such as Mylar. Surrounding the core wrap is a corrugated bronze shield member 30 provided for electrical grounding and corrosion characteristics, and around this is a polyvinylchloride jacket 32. This jacket may alternatively be formed from other materials such as polyethylene. The interstices of the core are filled with a fire retardant and water blocking filling composition according to any of the formulations 1, 2 and 3 described above. The interfacial area between the core wrap 28 and the corrugated bronze shield may also be flooded with a composition according to any of the above formulations.

What is claimed is:

1. A composition for a cable in which:
    the composition is fiber free and comprises in admixture and in parts by weight, 100 parts of amorphous polypropylene, from 10 to 70 parts of aluminum trihydrate or magnesium hydroxide, and an organic halogenated material and antimony trioxide, the organic halogenated material comprising decabromodiphenyloxide, bromated diphenyl ether, tetrabromophthalic anhydride, chlorendic anhydride or hexachlorocyclopentadiene and an aggregate of the halogenated material and antimony trioxide being from 5 to 30 parts, such that the composition is fire retardant and water resistant; and the amorphous polypropylene provides a continuous phase throughout the composition and has a low molecular weight to provide the composition with grease-like or jelly-like properties at room temperature.

2. A composition according to claim 1 comprising from 30 to 50 parts by weight of the aluminum trihydrate or magnesium hydroxide.

3. A composition according to claim 1 wherein the ratio of parts by weight of the organic halogenated material to the parts by weight of the antimony trioxide is at least 2:1.

4. A telecommunications cable having a core and comprising in the core a plurality of individually insulated conductors and a fiber free fire retardant and water blocking composition which lies within and substantially fills interstices between the individually insulated conductors and in which:

the composition comprises in admixture and in parts by weight, 100 parts of amorphous polypropylene, from 10 to 70 parts of aluminum trihydrate or magnesium hydroxide, and an organic halogenated material and antimony trioxide, the organic halogenated material comprising decabromodiphenyloxide, bromated diphenyl ether, tetrabromophthalic anhydride, chlorendic anhydride or hexachlorocyclopentadiene and an aggregate of the halogenated material and antimony trioxide being from 5 to 30 parts; and the amorphous polypropylene provides a continuous phase throughout the composition.

5. A cable according to claim 4 having a metal shield layer surrounding the core and a jacket layer surrounding the metal shield layer, a region beneath the jacket layer and adjacent the shield layer occupied by the fire retardant and water blocking composition.

6. A cable according to claim 1 wherein the molecular weight of the amorphouspolypropylene is less than 500,000.

7. A cable according to claim 6 wherein the molecular weight of the amorphous polypropylene is in a region around 10,000.

8. A cable according to claim 4 wherein the amorphous polypropylene has a low molecular weight to provide the composition with grease-like or jelly-like properties at room temperature.

9. A cable according to claim 8 wherein the molecular weight of the amorphous polypropylene is less than 500,000.

10. A cable according to claim 9 wherein the molecular weight of the amorphous polypropylene is in a region around 10,000.

* * * * *